(12) United States Patent
Matsuo et al.

(10) Patent No.: US 7,557,907 B2
(45) Date of Patent: Jul. 7, 2009

(54) OBJECT-DETECTION DEVICE FOR VEHICLE

(75) Inventors: Yuko Matsuo, Utsunomiya (JP);
Kenichi Sawada, Utsunomiya (JP);
Hiroyuki Koike, Utsunomiya (JP);
Katsuya Mizutani, Utsunomiya (JP);
Hiroaki Tani, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/187,903

(22) Filed: Aug. 7, 2008

(65) Prior Publication Data
US 2009/0040501 A1    Feb. 12, 2009

(30) Foreign Application Priority Data
Aug. 9, 2007    (JP) ............................. 2007-207753

(51) Int. Cl.
*G01P 3/36* (2006.01)
(52) U.S. Cl. .................................................. 356/28
(58) Field of Classification Search .................... 356/28
See application file for complete search history.

(56) References Cited

U.S. PATENT DOCUMENTS

| 5,929,803 A | 7/1999 | Uehara et al. | |
|---|---|---|---|
| 6,147,637 A * | 11/2000 | Morikawa et al. | 342/70 |
| 2005/0093735 A1 * | 5/2005 | Samukawa et al. | 342/70 |
| 2006/0089799 A1 | 4/2006 | Endoh | |
| 2008/0106459 A1 | 5/2008 | Jordan | |

FOREIGN PATENT DOCUMENTS

| JP | 11-38142 | 2/1999 |
|---|---|---|
| WO | WO-2006/034886 A1 | 4/2006 |

OTHER PUBLICATIONS

European Office Action for Application No. 08014148.4, dated Oct. 14, 2008.
Letter Weickmann & Weickmann indicating receipt of European Office Action on Nov. 4, 2008.

* cited by examiner

*Primary Examiner*—Thomas H Tarcza
*Assistant Examiner*—Luke D Ratcliffe
(74) *Attorney, Agent, or Firm*—Lahive & Cockfield, LLP; Anthony A. Laurentano

(57) ABSTRACT

The object-detection device for vehicle provides a transmission-and-reception device; a reflection point calculation device; a segment setting device; a median point calculation device; and a relative speed calculation device, wherein the relative speed calculation device eliminates a calculation result of the relative speed in the car width direction, with respect to the reflection points calculated based on the electromagnetic waves which are irradiated to the most downward direction in the specified angle in the vertical direction, in case that the number of difference between the reflection points in the current processing and the reflection points in the previous processing is equal to or greater than a predetermined number.

7 Claims, 6 Drawing Sheets

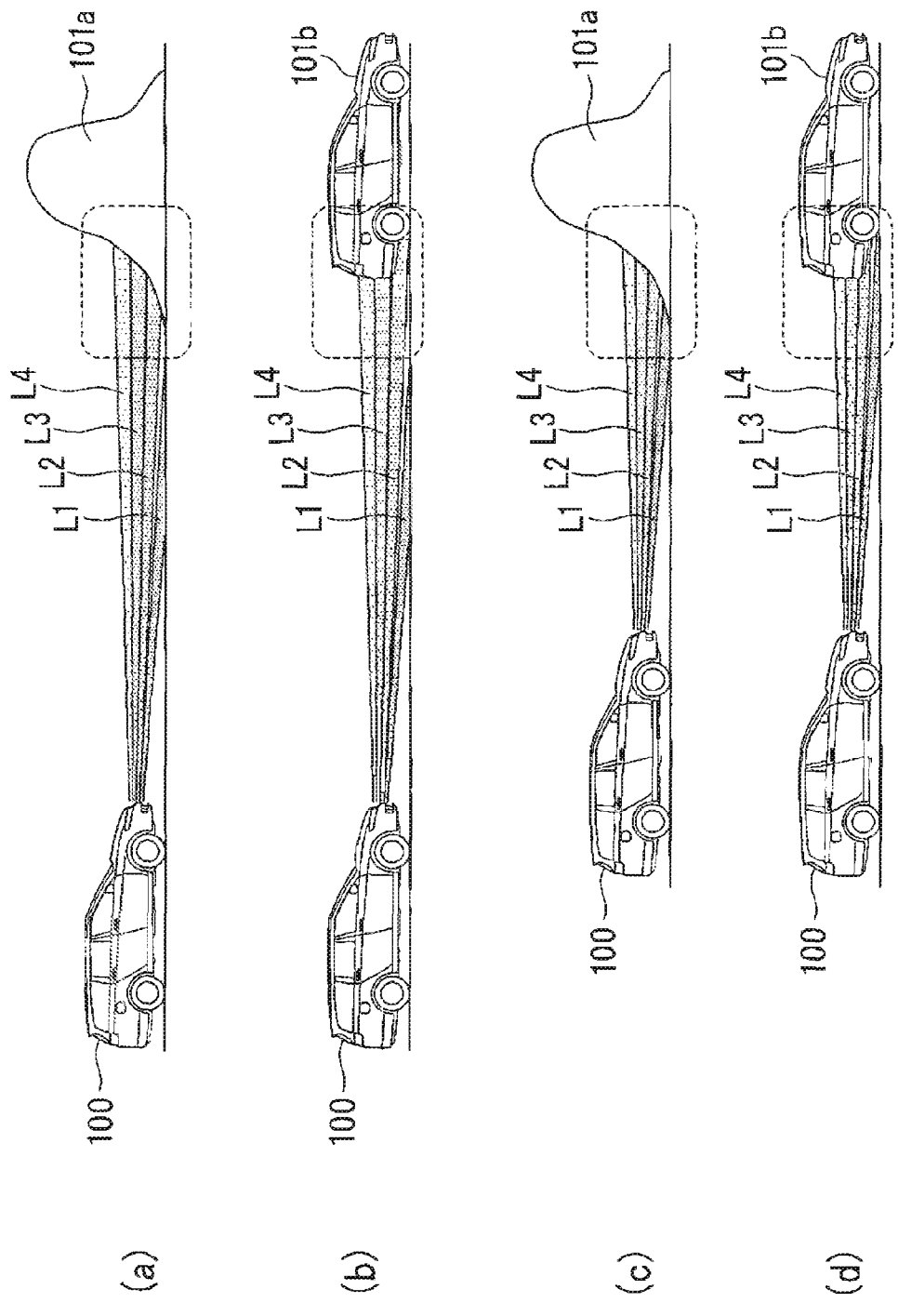

OBJECT-DETECTION DEVICE FOR VEHICLE

BACKGROUND OF THE INVENTION

Priority is claimed on Japanese Patent Application No. 2007-207753, filed Aug. 9, 2007, the contents of which are incorporated herein by reference.

1. Field of the Invention

The present invention relates to an object-detection device for a vehicle.

2. Description of the Related Art

Conventionally, there is known an object detection device for a vehicle which determines whether an object around a present vehicle is another vehicle or not through detecting the distance up to the object and the size and shape of the object by irradiating a laser in a specified angular range in the advancing direction of the present vehicle and scanning a reflected laser from the object (for example, refer to Japanese Unexamined Patent Application, First Publication No. H11-38142).

However, in the above conventional object-detection device for a vehicle, it was difficult to determine appropriately uncertain-shaped objects at roadside such as a snow bank by determination processing which was based on the size or shape of the object detected from reflected laser. Consequently, there is a concern that to distinguish and recognize the above roadside object and another vehicle around the present vehicle was difficult. In addition, even for a stationary object, there was a case in which a relative speed in the direction approaching to the vehicular-traveling-path of the present vehicle is detected by error due to a surface shape of the object such as a sloping surface. In this case, there is a problem in that unnecessary control is executed to avoid collision with the stationary object.

The present invention was made in view of the above-mentioned circumstances and has an object of providing an object-detection device for a vehicle which can detect appropriately the relative speed of an object around the present vehicle.

SUMMARY OF THE INVENTION

In order to solve the above problems and achieve the above object, the present invention employs the followings.

That is to say, an object-detection device for a vehicle of the present invention is provided with: a transmission-and-reception device which irradiates electromagnetic waves across specified angles along the horizontal and vertical directions around a present vehicle at predetermined intervals and receives reflected electromagnetic waves from an object which exists around the present vehicle; a reflection point calculation device which calculates reflection points on the surface of the object where the electromagnetic waves irradiated from the transmission-and-reception device are reflected; a segment setting device which recognizes that mutual reflection points whose distance of each electromagnetic wave is less than a first predetermined value are exist on the same segment; a median point calculation device which calculates a median point of the segment; and a relative speed calculation device which calculates a relative speed of the present vehicle to the object based on the median point, wherein the relative speed calculation device eliminates a calculation result of the relative speed in the car width direction, with respect to the reflection points calculated based on the electromagnetic waves which are irradiated to the most downward direction in the specified angle in the vertical direction, in case that the number of difference between the reflection points in the current processing and the reflection points in the previous processing is equal to or greater than a predetermined number.

According to the above object-detection device for a vehicle, in case that rapid increase of the number of the reflection points calculated based on the electromagnetic waves which are irradiated to the most downward direction in the specified angle in the vertical direction is detected in time series variations, the calculation result of the relative speed in the car width direction of the present vehicle is eliminated. Consequently, it is possible to prevent the generation of incorrect relative speed in the car width direction with respect to the stationary object which has an expanding sloping surface such as a snow bank.

It may be arranged such that the object-detection device for a vehicle is provided with the relative speed calculation device eliminates the calculation result of the relative speed in the car width direction, with respect to the reflection points calculated based on the electromagnetic waves which are irradiated to the most downward direction in the specified angle in the vertical direction, in case that the number of difference between the reflection points in the current processing and the reflection points in the previous processing is equal to or greater than a predetermined number and the distance between the reflection points calculated based on each adjacent electromagnetic wave in the vertical direction is equal to or greater than a predetermined distance.

In this case, when the distance between the reflection points which is calculated based on the electromagnetic waves with different irradiating angles is greater than the predetermined distance, the calculation result of the relative speed in the car width direction of the present vehicle is eliminated. Consequently, it is possible to prevent the generation of incorrect relative speed in the car width direction with respect to the stationary object which has expanding sloping surface such as a snow bank.

The object-detection device may further include a relative distance calculation device, which calculates the relative distance between the present vehicle and the object based on the median point and sets the predetermined distance based on the relative distance.

In this case, since the predetermined distance which is determination threshold value is set in response to a positional relation between the present vehicle and the object, it is possible to eliminate more accurately the calculation result of the relative speed in the car width direction of the present vehicle.

In the object-detection device for a vehicle of the present invention, the relative speed calculation device may set the predetermined number based on the number of the reflection points calculated in the previous processing based on the electromagnetic waves which are irradiated to other than the most downward direction among the specified angle in the vertical direction.

In this case, since the predetermined number which is determination threshold value is set based on the number of the reflection points calculated in the previous processing, it is possible to eliminate more accurately the calculation result of the relative speed in the car width direction of the present vehicle.

BRIEF DESCRIPTION OF THE DRAWINGS

FIG. 3 shows cases (a)-(d) which are side views showing the positional relation between each scanning regions (the first layer L1—the fourth layer L4) and each object in case that a present vehicle 100 approaches to an object from a far distance. The case (a) shows the far distance condition and there is a sloping object such as a snow bank 101a having bell shape which expands in the vertical downward direction like a snow bank or a levee in the scanning region of the radar device. The case (b) shows the far distance condition and there is a non-sloping object such as another vehicle 101b or a building having a nearly parallel plane in the vertical direction in the scanning region of the radar device. The case (c) shows the near distance condition and there is a sloping object such as the snow bank 101a having bell shape which expands in the vertical downward direction like a snow bank or a levee in the scanning region of the radar device. The case (d) shows the near distance condition there is a non-sloping object such as another vehicle 101b or a building having a nearly parallel plane in the vertical direction in the scanning region of the radar device.

DETAILED DESCRIPTION OF THE INVENTION

Hereunder is a description of an object-detection device according to an embodiment of the present invention, with reference to accompanying drawings.

Figure 1:
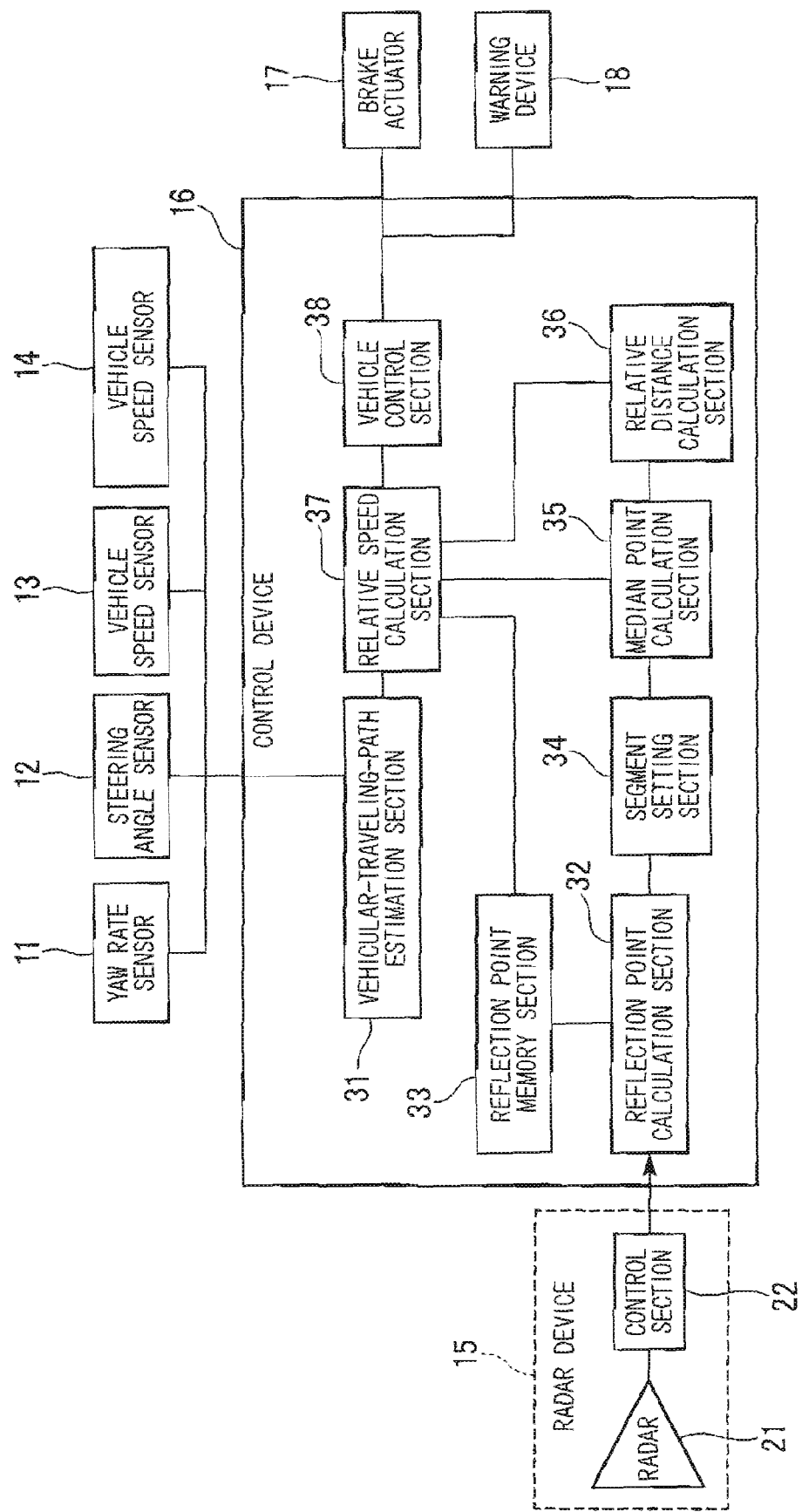
FIG. 1 is a block diagram of an object-detection device for a vehicle according to one embodiment of the present invention.

The object-detection device for a vehicle of the present embodiment, as shown in FIG. 1, is provided with a yaw rate sensor 11, a steering angle sensor 12, a vehicle speed sensor 13, a navigation device 14, a radar device 15, a control device 16, a brake actuator 17, and a warning device 18.

The yaw rate sensor 11 measures a yaw rate variation of the present vehicle which is the rotating angle variation around the vertical axis at the center of gravity of the present vehicle. The steering angle sensor 12 measures an actual steering angle (rotational steering angle) in response to the operating steering angle (for example, the direction of the operating steering angle input by a driver) of the present vehicle. The vehicle speed sensor 13 measures the speed of the present vehicle (vehicle speed). The navigation device 14 measures the actual location of the present vehicle, for example, by a positioning signal received from a satellite or a ground station, or by a calculation processing of an autonomous navigation based on the detection signals from each sensor 11 and 13. In conjunction with the measurement of the actual location of the present vehicle, the navigation device 14 executes map matching for specified road data based on the actual location information and adjusts the measurement result of the actual location of the present vehicle. Subsequently, the navigation device 14 controls a map display on a monitor (not shown in the figures) for an appropriate location information input by an operator through each kind of input devices (for example, a touch panel), and performs a processing such as route searching or road guidance.

The radar device 15 is provided with a radar 21 which is beam-scan type irradiating electromagnetic waves such as laser or millimeter waves towards the advancing direction of the present vehicle and receiving reflection waves which are the generated electromagnetic waves reflected from an object in a detection region, and a control section 22 which generates beat signals by mixing the irradiated electromagnetic waves and the received electromagnetic waves (reflection waves).

The detection region of the radar device 15 is divided into a plurality of scanning regions set in 3-D angle directions and the radar device 15 scans the detection region divided in a plurality of scanning regions.

The control device 16 is provided with a vehicular-traveling-path estimation section 31, a reflection point calculation section 32, a reflection point memory section 33, a segment setting section 34, a median point calculation section 35, a relative distance calculation section 36, a relative speed calculation section 37, and a vehicle control section 38.

The vehicular-traveling-path estimation section 31 estimates the vehicular-traveling-path of the present vehicle based on the actual location information of the present vehicle calculated by the detection signals from each of the sensors 11, 12, and 13 and the navigation device 14.

The reflection point calculation section 32, based on the beat signals output from the control section 22 of the radar device 15, calculates the location for which the reflection wave received by radar 21 is generated, that is to say, the reflection points when the electromagnetic waves irradiated from the radar 21 are reflected on the surface of the object which exists outside the present vehicle.

The reflection point memory section 33 stores the plurality of reflection points calculated by the scanning by the radar device 15 in memory.

In order to classify the plurality of reflection points obtained from the reflection point calculation section 32 and the reflection point memory section 33 into groups, relating to the same object for each scanning region, the segment setting section 34, executes a process of determining whether or not the distance between mutual reflection points with respect to the plurality of reflection points is less than a first predetermined value for each scanning region, and generates groups related to the same object. Subsequently, in order to link groups relating to the same object by straddling between the plurality of scanning regions (for example, between adjacent scanning regions in 3-D space), the segment setting section 34 determines with respect to the groups generated for each scanning region whether or not the mutual groups are related to the same object within the plurality of scanning regions, and generates segments by linking groups relating to the same object in response to the determination result.

In order to determine whether or not the segment at time (N−1) and the segment at time N, N is an arbitrary natural number, are identical, the segment setting section 34 determines with respect to the plurality in a time series whether or not the distance between the median point position at 1 time next (that is, at the time N) estimated by, for example, a Kalman filter of the median point calculation section 35 with respect to the segment at the time (N−1) and the median point of the segment at time N calculated by the median point calculation section 35 is less than a second predetermined value.

Furthermore, with respect to the relative speed of each segment calculated by the relative speed calculation; section 37 based on the median point of each segment calculated by the median point calculation section 35, the segment setting section 34 determines whether or not a correlation value (for example, the inner product of the moving vector) between, for example in a time series, the relative speed of the segment at time (N−1) and the relative speed of the segment at time N is greater than or equal to a third predetermined value.

In case that the distance between the median point position at 1 time next (that is, at the time N) which is estimated by the segment at time (N−1) and the median point position of the segment at time N is less than the second predetermined value, and in case that the correlation value (for example, the inner product of the moving vector) between the relative speed of the segment at time (N−1) and the relative speed of the segment at time N is less than the third predetermined value, the segment setting section 34 recognizes that the segment at time (N−1) and the segment at time N are the same segment.

The median point calculation section 35 calculates the median point position of segments related to the each same object set by the segment setting section 34.

The relative distance calculation section 36 calculates the relative distance between the present vehicle and the object using the median point position calculated by the median point calculation section 35.

The relative speed calculation section 37 calculates the relative speed between the present vehicle and the object using a time series variation of the median point position calculated by the median point calculation section 35.

However, in case that the number of difference between the reflection points in the current processing and the reflection points in previous processing is equal to or greater than a predetermined number, with respect to the reflection points calculated based on the electromagnetic waves irradiated to the most downward direction in the vertical direction among the electromagnetic waves irradiated from the radar 21 among predetermined angles for the horizontal and vertical directions around the present vehicle, or in case that the number of difference between the reflection points in the current processing and the reflection points in the previous processing is equal to or greater than a predetermined number and the distance between the reflection points between mutual scanning regions calculated based on the electromagnetic waves for each adjacent scanning regions in the vertical direction is equal to or greater than a predetermined distance, the relative speed calculation section 37 eliminates the calculation result of relative speed in the car width direction of the vehicle.

The relative speed calculation section 37 sets the predetermined distance which is a determination threshold value with respect to the distances between the reflection points, based on the relative distance between the present vehicle and the object calculated by the relative distance calculation section 36, and sets the predetermined number, which is a determination threshold value with respect to the number of the reflection points, based on the reflection points in the number of the previous processing by electromagnetic waves irradiated to other than the most downward direction in the vertical direction.

Figure 2:
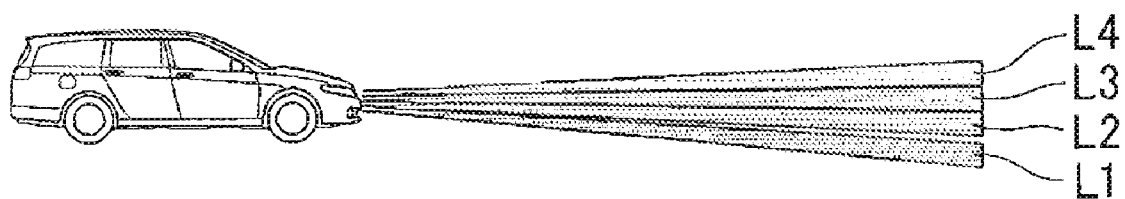
FIG. 2 is a side view showing one example of multiple scanning regions in the vertical direction of a radar device according to the embodiment.
Figure 4B:
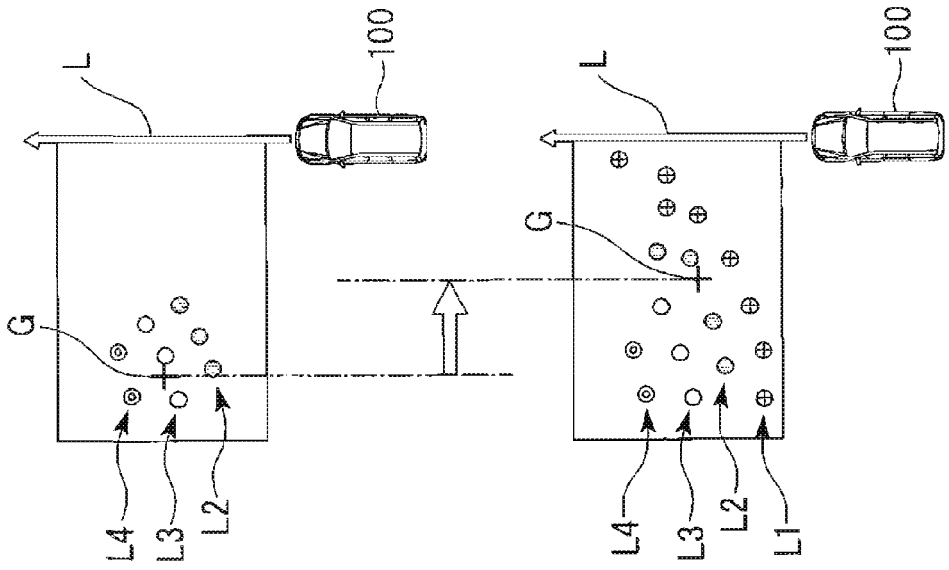
FIG. 4B is a plan view showing one example of the positional distribution of a plurality of reflection points in each scanning region (the first layer L1—the fourth layer L4) on a snow bank which is a sloping object.
Figure 4A:
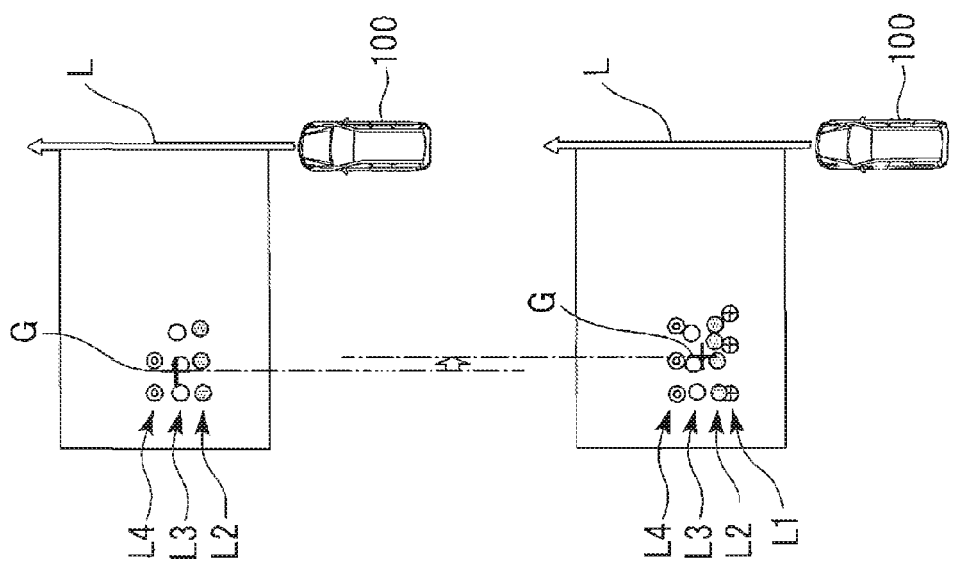
FIG. 4A is a plan view showing one example of the positional distribution of a plurality of reflection points in each scanning region (the first layer L1 to the fourth layer L4) on another vehicle which is a non-sloping object.

FIG. 2 shows the condition in which the four layers of a first layer L1 to a fourth layer L4 are set so that the irradiation angle of the electromagnetic waves gradually turn toward from the downside to the upside in the vertical direction. In this condition, as shown in FIG. 3, in case that there is a sloping object such as a snow bank 101a having bell shape which expands in a vertical downward direction like a snow bank or a levee in the detection region of the radar device 15 (under conditions shown in (a) and (c) of FIG. 3), and in case that there is a non-sloping object such as another vehicle 101b or a building having a nearly parallel plane in the vertical direction in the detection region of the radar device (under conditions shown in (b) and (d) of FIG. 3), if the present vehicle 100 approaches to the object from a far distance to a near distance, the positional distribution of the plurality of reflection points detected by the electromagnetic waves irradiated from the radar device 15 changes, for example, as shown in FIGS. 4A and 4B. While, the top of FIG. 4A shows the condition for which the distance between the present vehicle 100 and the object (another vehicle 101b) is comparatively far, while the bottom of FIG. 4A shows the condition for which the distance between the present vehicle 100 and the object (another vehicle 101b) is comparatively near. In addition, the top of FIG. 4B shows the condition for which the distance between the present vehicle 100 and the object (snow bank 101a) is comparatively far, while the bottom of FIG. 4B shows the conditions for which the distance between the present vehicle 100 and the object (snow bank 101a) is comparatively near.

Figure 5A:
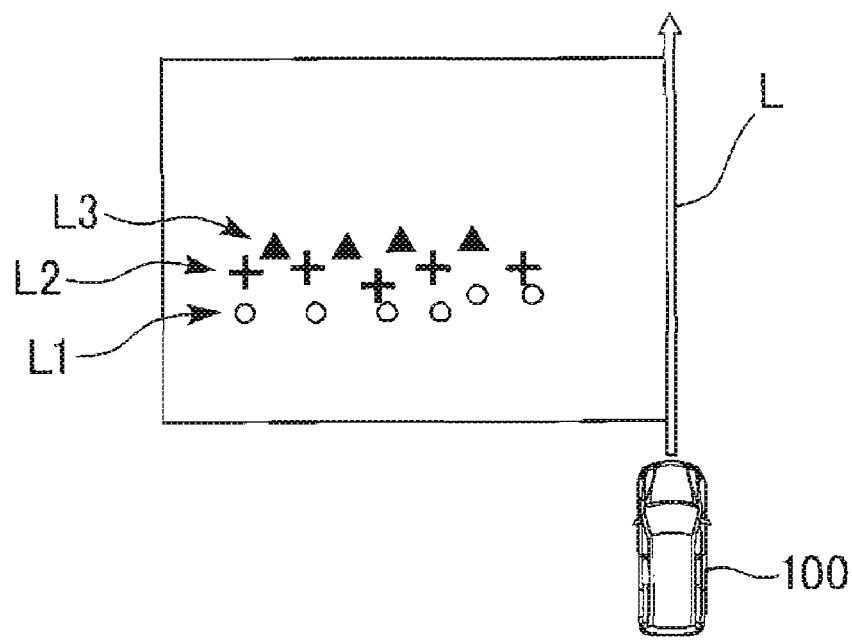
FIG. 5A is a plan view showing one example of the positional distribution of a plurality of reflection points in each scanning region (the first layer L1 to the third layer L3) on a non-sloping object such as another vehicle or a building.

When there is a non-sloping object such as another vehicle 101b in the detection region of the radar device 15, as shown in FIG. 4A, if the present vehicle 100 approaches to the object from a far distance to a near distance, with respect to the downward layer (for example, the first layer L1) in the vertical direction which is not detected under far distance condition, the reflection point in the downward layer will be detected under near distance condition. Subsequently, the number of the reflection points detected for each of the layers L1 to L4 is approximately same before and after approaching to the object of the present vehicle 100. As shown in FIG. 5A, the distances between the reflection points among each of the mutual layers L1 to L4 become relatively short compared to the sloping object. Consequently, as shown in FIG. 4A, the position of the median point G calculated from these reflection points is nearly the same before and after approaching.

Figure 5B:
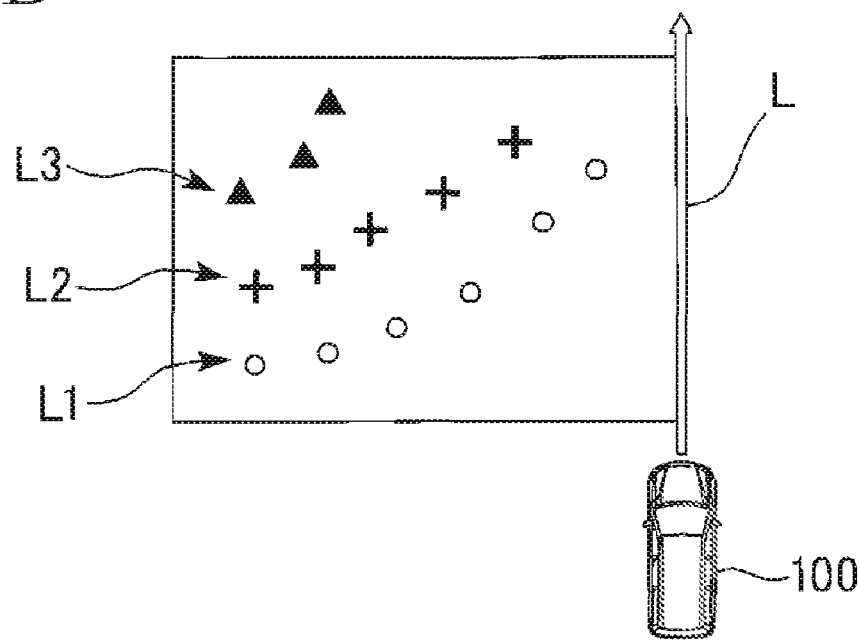
FIG. 5B is a plan view showing one example of the positional distribution of a plurality of reflection points in each scanning region (the first layer L1 to the third layer L3) on a sloping object such as a snow bank.

When there is a sloping object such as the snow bank 101a in the detection region of the radar device 15, as shown in FIG. 4B, if the present vehicle 100 approaches to the object from a far distance to a near distance, with respect to the downward layer (for example, the first layer L1) in the vertical direction which is not detected under far distance condition, the reflection points in the downward layer will be detected under near distance condition. Subsequently, the number of the reflection points detected for each of layers L1 to L4 has tendency to increase in accordance with approaching to the object of the present vehicle 100 especially downward layer in the vertical direction (for example, the second layer L2 and the first layer L1). As shown in FIG. 5B, the distance between reflection points among each of the mutual layers L1 to L4 becomes relatively longer compared to the object which is a non sloping object. Consequently, as shown in FIG. 4B, the position of the median point G calculated from these reflection points changes so as to more closely approach the vehicular-traveling-path L, in accordance with approaching to the object of the present vehicle 100. That is to say, if the present vehicle 100 approaches the sloping object, with the respect to the relative distance between the present vehicle 100 and the object, since the effect of shape changes on the sloping part of the sloping object increases, the relative speed in the approaching direction to the vehicular-traveling-path L of the present vehicle 100 (that is, in the car width) is faultily detected.

Accordingly, with respect to the reflection points calculated based on the electromagnetic waves irradiated from the radar 21 to the most downward direction in the vertical direction, in case that the number of difference between the reflection points in current processing and the reflection points in previous processing is greater than or equal to the predetermined number, and furthermore, in case that the distance between reflection points between the mutual scanning regions based on the electromagnetic waves for each adjacent scanning regions in the vertical direction is greater than or equal to the predetermined distance, the calculation result of the relative speed in the car width direction of the vehicle 100 is eliminated. Accordingly, with respect to the stationary sloping object in the detection region of radar device 15, it is possible to prevent faulty detection of the relative speed in the car width direction approaching to the vehicular-traveling-path L of the present vehicle 100.

In response to the relative speed between the present vehicle 100 and the object, the relative speed being output from the relative speed calculation section 37, the vehicle control section 38 sets the output timing and the output details of the warning. Subsequently, the vehicle control section 38 sets the execution timing and the control details (for example, reduced speed under moderation control) of the running control which controls the running condition of the present vehicle 100 so that the present vehicle 100 avoids collision with the object or reduces the damage during collision. Additionally, in response to setup control details, the vehicle control section 38 outputs, for example, a control signal which controls a speed reduction motion by a brake actuator 17, a control signal which controls a steering control motion of a steering mechanism (not illustrated), a control signal which controls a shift motion of a shift mechanism (not illustrated) of the present vehicle 100, and a control signal which controls warning motion output from the warning device 18.

The warning device 18 is provided with, for example, a tactile communication device, a visual communication device, and an aural communication device.

The tactile communication device is, for example, a seat belt device or a steering control device. In response to the control signal input from the vehicle control section 38, for example, the driver of the present vehicle 100 feels a perceptible tightening of the seat belt by a specified tension on the seat belt or the driver of the present vehicle 100 feels a perceptible vibration (steering vibration) on the steering wheel, and the driver is recognized the possibility of collision with the object.

The visual communication device is, for example, a display device. In response to the control signal input from the vehicle controls section 38, for example, the driver of the present vehicle 100 is notified by displaying specified warning information on the display device or illuminating a specified warning light, and the driver is recognized the possibility of collision with the object.

The aural communication device is, for example, a speaker. In response to the control signal input from the vehicle controls section 38, for example, the driver of the present vehicle 100 is notified by outputting a specified warning sound or a voice, and the driver is recognized the possibility of collision with the object.

Hereunder is a description of the operation of the object-detection device 10 for a vehicle of the present embodiment described above, especially processing which calculates the relative speed of the object by the plurality of reflection points which are calculated in accordance with scanning by the radar device 15.

Figure 6:
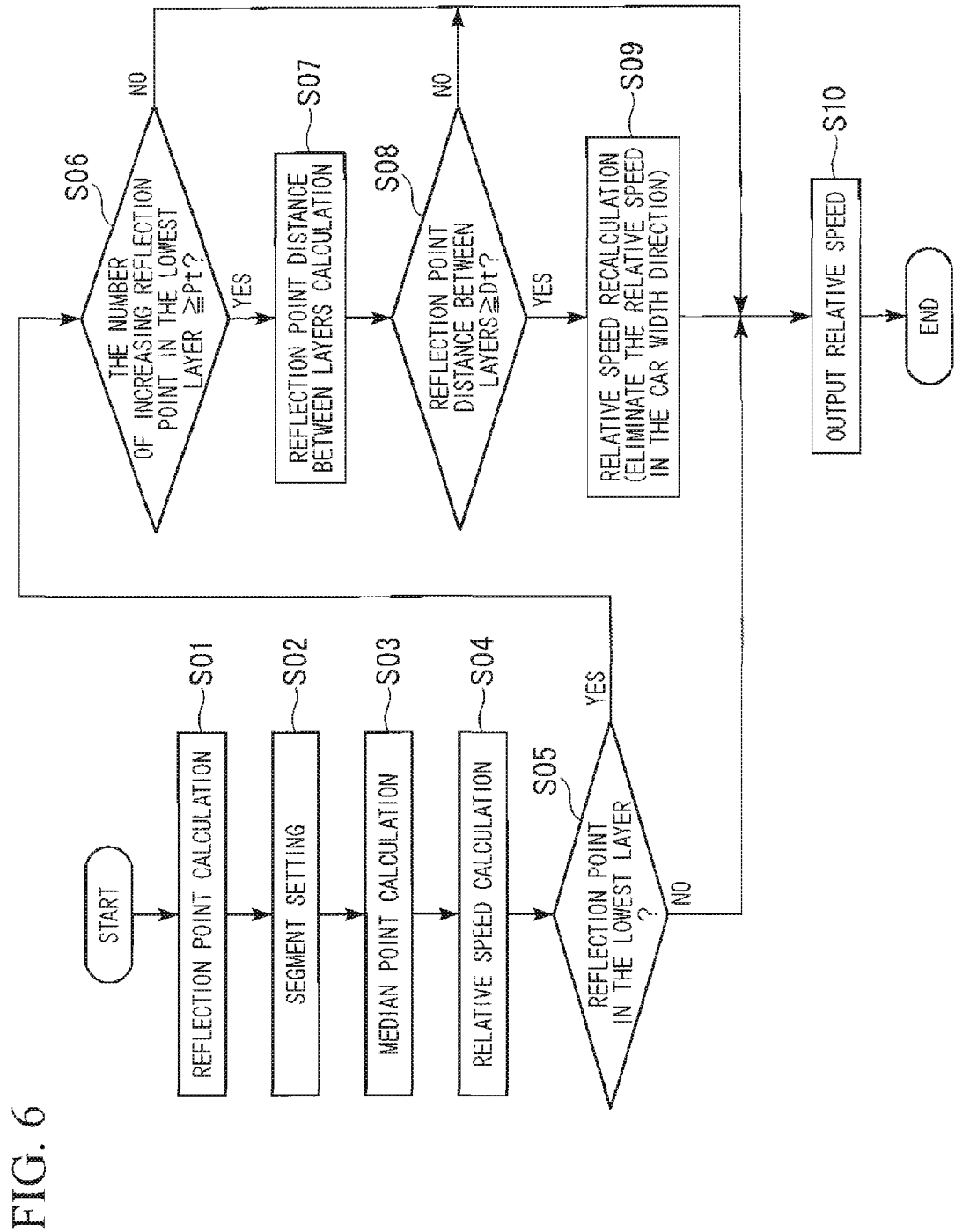
FIG. 6 is a flowchart showing the operation of the object-detection device for a vehicle according to the embodiment.

First, for example, in step S01 shown in FIG. 6, in response to the scanning by the radar device 15 which is executed for each scanning region, the reflection points are calculated when the electromagnetic waves irradiated from the radar 21 are reflected on the surface of object which exists outside surrounding of the present vehicle 100.

Next, in step S02, in order to classify the plurality of reflection points which are calculated for each scanning region into the groups related to the same object, a determination processing is executed, for each scanning region, whether or not the distance between the mutual reflection points for the plurality of reflection points is less than a first predetermined value. Subsequently, the mutual reflection points whose determination result is a "YES" are classified into the same group. With respect to groups generated for each scanning region, in order to link groups relating to the same object by straddling over the plurality of scanning regions (for example, between adjacent scanning regions in 3-D space), it is determined whether or not the mutual groups among the plurality of scanning regions relate to the same object. In response to the determination result, segments are generated by linking the mutual groups relating to the same object.

Next, in step S03, the median point position of each segment is calculated.

Next, in step S04, the relative speed of the vehicle 100 and the object is calculated based on time series variations of the median point position of each segment.

Next, in step S05, it is determined whether or not the reflection points are calculated for a lowest layer (for example, layer L1 shown in FIG. 2) which is the most downward scanning region in the vertical direction among the plurality of scanning regions of the radar device 15.

If this determination result is "No", then the process proceeds to step S10 described later.

On the other hand, if this determination result is "YES", then the process proceeds to step S06.

In step S06, it is determined whether or not the increase in the number of the reflection points calculated in the lowest layer in the current processing with respect to the number of the reflection points calculated in the lowest layer in the previous processing is equal or greater than the predetermined threshold value Pt.

If this determination result is "NO", then the process proceeds to step S10 described later.

On the other hand, If this determination result is "YES", then the process proceeds to step S07.

In step S07, the distance between the reflection points of the mutual scanning regions which is calculated based on the electromagnetic waves for each adjacent scanning regions (for example, each of the layers L1 to L4 shown in FIG. 2) in the vertical direction.

In step S08, it is determined whether or not the distance (the distance between reflection points straddling between layers) between reflection points straddling over the mutual scanning regions is greater than or equal to the predetermined threshold value Dt.

If this determination result is "NO", then the process proceeds to step S10 described later.

On the other hand, if this determination result is "YES", then the process proceeds to step S09.

In step S09, the calculation result of the relative speed in the car width direction of the present vehicle 100 which is calculated in the described above step S04 is eliminated and the relative speed between the present vehicle 100 and the object which is recalculated.

In Step S10, the calculation result of the relative speed is output, and then the series of processings ends.

As described above, according to the object-detection device for a vehicle of the present embodiment, in case it is detected that an increase in the number of the reflection points in time series variations, which was calculated based on the electromagnetic waves irradiated from the radar device 15 to the most downward direction, is greater than or equal to the predetermined threshold value Pt, or in case it is detected that an increase in the number of the reflection points in time series variations, which calculated based on the electromagnetic waves irradiated from the radar device 15 to the most downward direction, is greater than or equal to the predetermined threshold value Pt and in case that the distance between the reflection points for the mutual scanning regions calculated based on the electromagnetic waves irradiated to adjacent scanning regions in the vertical direction is greater than or equal to the predetermined threshold value Dt, the calculation result of the relative speed in the car wise direction of the present vehicle on the vehicular-traveling-path L of the present vehicle 100 is eliminated. According to the above calculation, it is possible to prevent the generation of incorrect relative speed in the car width direction approaching the vehicular-traveling-path L of the present vehicle 100 with respect to the stationary object which has expanding sloping surface such as a snow bank or a levee.

Furthermore, the predetermined threshold value Dt which is a determination threshold value for the distance between the reflection points is set based on the relative distance between the present vehicle 100 and the object, and the predetermined threshold value Pt which is determination threshold value for the number of the reflection points based on the number of reflection points in previous processing based on electromagnetic waves irradiated to other than the most downward direction in the vertical direction. As a result, the calculation results of the relative speed in the car width direction can be eliminated more accurately.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An object-detection device for a vehicle comprising:
    a transmission-and-reception device which irradiates electromagnetic waves across specified angles along the horizontal and vertical directions around a present vehicle at predetermined intervals and receives reflected electromagnetic waves from an object which exists around the present vehicle;
    a reflection point calculation device which calculates reflection points on the surface of the object where the electromagnetic waves irradiated from the transmission-and-reception device are reflected;
    a segment setting device which recognizes that mutual reflection points whose distance of each electromagnetic wave is less than a first predetermined value are exist on the same segment;
    a median point calculation device which calculates a median point of the segment; and
    a relative speed calculation device which calculates a relative speed of the present vehicle to the object based on the median point, wherein
    the relative speed calculation device eliminates a calculation result of the relative speed in the car width direction, with respect to the reflection points calculated based on the electromagnetic waves which are irradiated to the most downward direction in the specified angle in the vertical direction, in case that the number of difference between the reflection points in the current processing and the reflection points in the previous processing is equal to or greater than a predetermined number.

2. The object-detection device for a vehicle according to claim 1, wherein
    the relative speed calculation device eliminates the calculation result of the relative speed in the car width direction, with respect to the reflection points calculated based on the electromagnetic waves which are irradiated to the most downward direction in the specified angle in the vertical direction, in case that the number of difference between the reflection points in the current processing and the reflection points in the previous processing is equal to or greater than a predetermined number and the distance between the reflection points calculated based on each adjacent electromagnetic wave in the vertical direction is equal to or greater than a predetermined distance.

3. The object-detection device for a vehicle according to claim 1, further comprising
    a relative distance calculation device, which calculates the relative distance between the present vehicle and the object based on the median point and sets the predetermined distance based on the relative distance.

4. The object-detection device for a vehicle according to claim 2, further comprising
    a relative distance calculation device, which calculates the relative distance between the present vehicle and the object based on the median point and sets the predetermined distance based on the relative distance.

5. The object-detection device for a vehicle according to claim 1, wherein
    the relative speed calculation device sets the predetermined number based on the number of the reflection points calculated in the previous processing based on the electromagnetic waves which are irradiated to other than the most downward direction among the specified angle in the vertical direction.

6. The object-detection device for a vehicle according to claim 2, wherein
    the relative speed calculation device sets the predetermined number based on the number of the reflection points calculated in the previous processing based on the electromagnetic waves which are irradiated to other than the most downward direction among the specified angle in the vertical direction.

7. The object-detection device for a vehicle according to claim 3, wherein
    the relative speed calculation device sets the predetermined number based on the number of the reflection points calculated in the previous processing based on the electromagnetic waves which are irradiated to other than the most downward direction among the specified angle in the vertical direction.

* * * * *